(12) United States Patent
Pionnetti

(10) Patent No.: US 7,793,992 B2
(45) Date of Patent: Sep. 14, 2010

(54) JUNCTION PART FOR COAXIAL PIPE ELEMENTS, AND A METHOD OF JOINING TOGETHER COAXIAL PIPE ELEMENTS

(75) Inventor: François-Régis Pionnetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 813 days.

(21) Appl. No.: 11/658,046

(22) PCT Filed: Jul. 1, 2005

(86) PCT No.: PCT/FR2005/001674

§ 371 (c)(1),
(2), (4) Date: Jan. 22, 2007

(87) PCT Pub. No.: WO2006/021637

PCT Pub. Date: Mar. 2, 2006

(65) Prior Publication Data

US 2008/0315578 A1    Dec. 25, 2008

(30) Foreign Application Priority Data

Jul. 23, 2004    (FR) .................................. 04 08156

(51) Int. Cl.
*F16L 13/02*    (2006.01)
(52) U.S. Cl. ................. 285/288.1; 285/123.15
(58) Field of Classification Search ............ 285/123.15, 285/123.16, 288.1–288.9, 288.11; 29/527.1; 228/135, 159–161, 164–165, 170–172, 173.4–173.5, 228/174; 219/136
See application file for complete search history.

(56) References Cited

U.S. PATENT DOCUMENTS

| | | | | |
|---|---|---|---|---|
| 2,732,229 | A | * | 1/1956 | Guam ........................ 285/21.1 |
| 3,268,248 | A | * | 8/1966 | Chambers ................ 285/288.6 |
| 3,563,713 | A | * | 2/1971 | Rudd .......................... 228/107 |
| 3,733,686 | A | * | 5/1973 | Maucher ..................... 228/165 |
| 3,843,170 | A | * | 10/1974 | Bagnulo ....................... 285/55 |
| 4,400,019 | A | * | 8/1983 | Fruck .......................... 285/55 |
| 4,560,188 | A | | 12/1985 | Berti et al. |
| 4,670,256 | A | | 6/1987 | Doran |
| 4,997,211 | A | * | 3/1991 | Brucher ....................... 285/41 |
| 5,400,828 | A | * | 3/1995 | Ziu et al. .................... 138/113 |
| 6,386,427 | B2 | * | 5/2002 | Iwago et al. ................ 228/164 |
| 7,510,218 | B2 | * | 3/2009 | Holdren .................... 285/288.6 |

FOREIGN PATENT DOCUMENTS

| | | |
|---|---|---|
| FR | 2 751 721 | 1/1998 |
| GB | 2161565 | 1/1986 |
| GB | 2 191 842 | 12/1987 |
| GB | 2 315 835 | 2/1998 |
| GB | 2396196 | 6/2004 |

* cited by examiner

*Primary Examiner*—Aaron Dunwoody
(74) *Attorney, Agent, or Firm*—Cohen Pontani Lieberman & Pavane LLP

(57) ABSTRACT

A cylindrical junction part for joining together two elements of an assembly of at least two coaxial pipes, comprising an outer pipe containing an inner pipe defining an annular space preferably containing lagging material. The forged junction part forms two annular cavities defined by branches in a fork configuration at each end of said part serving to minimize stresses and fatigue in the join zone between two junction parts at the ends of two lengths of coaxial pipe to be joined together and between each length of pipe and each junction part at the ends thereof.

18 Claims, 2 Drawing Sheets

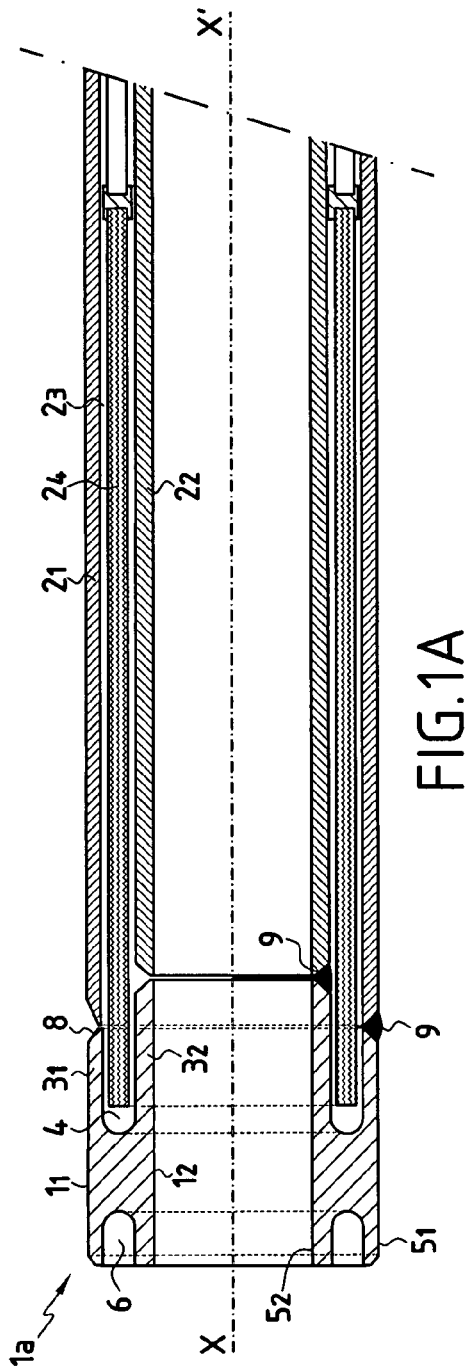
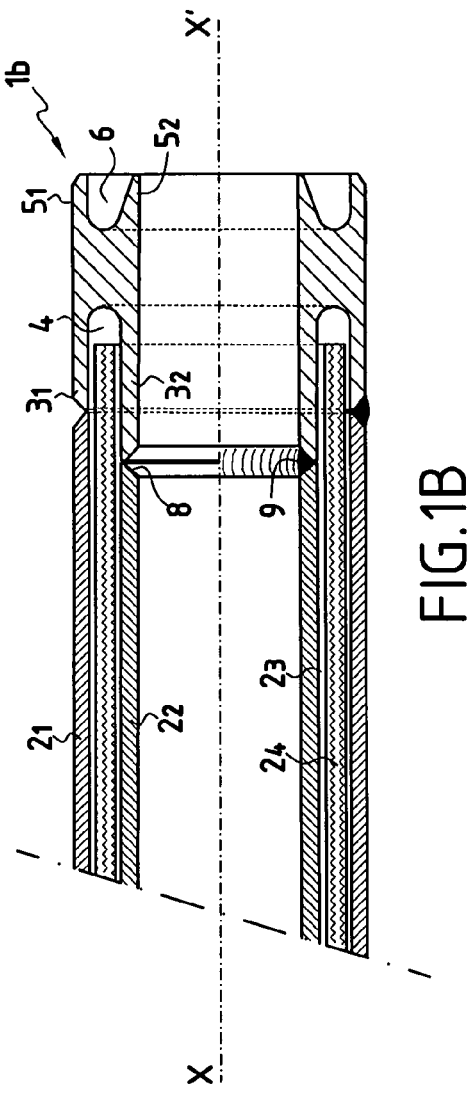

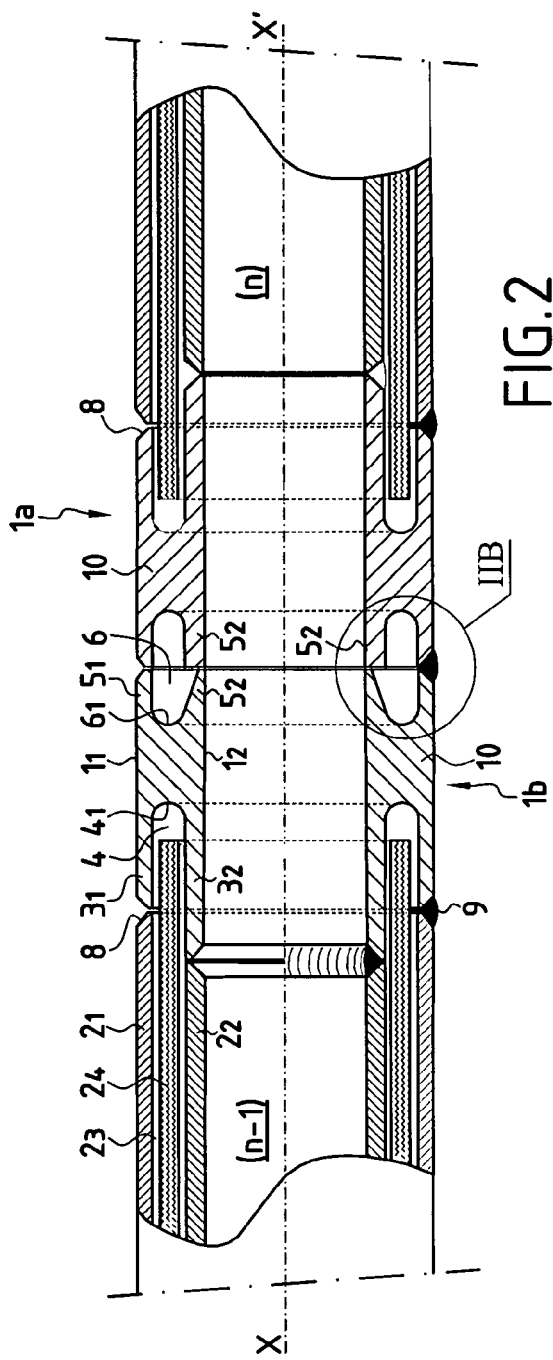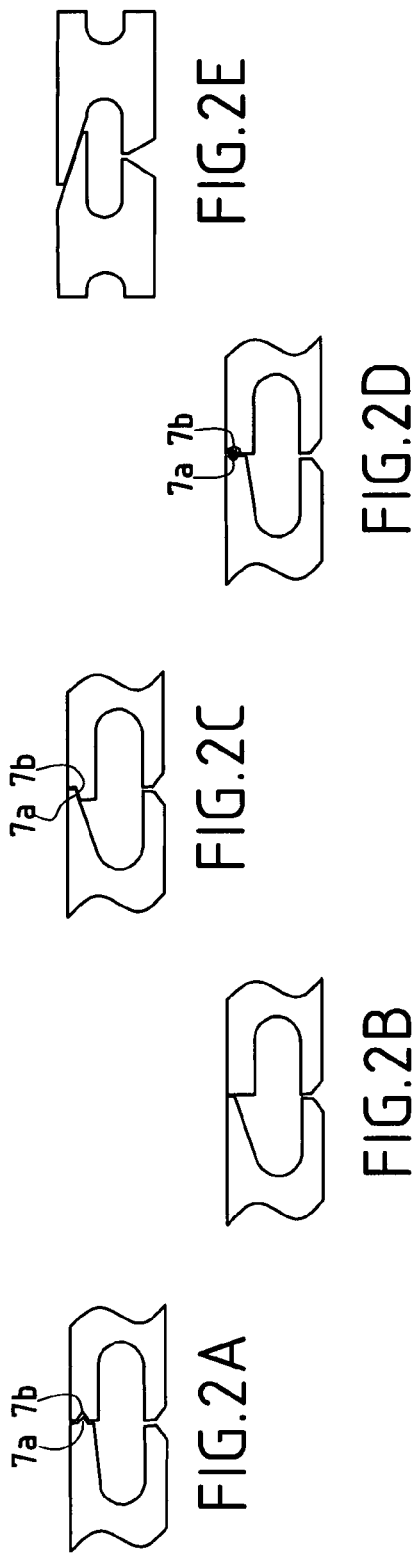

JUNCTION PART FOR COAXIAL PIPE ELEMENTS, AND A METHOD OF JOINING TOGETHER COAXIAL PIPE ELEMENTS

PRIORITY CLAIM

This is a U.S. national stage of application No. PCT/FR2005/001674, filed on Jul. 7, 2005. Priority is claimed on the following application(s): Country: France, Application No.: 0408156, Filed: Jul. 23, 2004; the content of which is incorporated here by reference.

FIELD OF THE INVENTION

The present invention relates to the field of double-walled pipes including an insulating complex, in particular undersea pipes for conveying hot or cold fluids.

The present invention relates in particular to undersea pipes having reinforced insulation, as installed on oil fields at great depths, and also to pipes that are suspended between the sea bottom and a surface ship anchored over said oil field.

More precisely, the present invention relates to a cylindrical junction part for joining together two coaxial pipe assembly elements each comprising two pipes: an outer pipe and an inner pipe, the pipes defining between them an annular space that preferably contains lagging material.

The present invention also relates to a method of joining together two elements each constituted by an assembly of two coaxial pipes and having junction parts of the invention at their ends.

BACKGROUND OF THE INVENTION

In most industrial fields, it is desirable to have high-performance insulation systems to ensure that fluids being conveyed in pipework are maintained at constant temperature so that transfers between pieces of equipment can be made possible over considerable distances, e.g. as much as several hundreds of meters, or even several kilometers. Such distances are commonplace in industries such as oil refineries, liquefied natural gas installations (at −165° C.), and undersea oil fields that extend over several tens of kilometers. Such oil fields are being developed in depths of water that are becoming ever deeper, and can be at depths considerably greater than 3000 meters (m).

Numerous systems have been developed for reaching a high level of thermal performance, and specific versions have been developed to accommodate great depths as appropriately as possible, i.e. to be capable of withstanding pressure at the bottom of the sea. The highest performance technologies that have been developed for achieving this objective are so-called pipe-in-pipe (PiP) technologies in which an inner pipe conveys the fluid, and an outer pipe disposed coaxially around the inner pipe comes into contact with the surrounding medium, i.e. water. The annular space between the two pipes can be filled with lagging material, or it can be evacuated so as to be free of gas.

In this type of pipe, the annular space, whether or not filled with lagging material, is generally at an absolute pressure that is lower than atmospheric pressure, and it might be completely evacuated, so to a first approximation, the inner pipe can be considered as radially withstanding the bursting pressure due to the internal fluid, while the outer pipe withstands implosion created by the hydrostatic pressure ($\rho gh$) at the sea bottom, which pressure is about 1 megapascal (MPa) per 100 m of depth of water, i.e. 30 MPa at a depth of 3000 m. The axial effect due to pressure, referred to as the "bottom" effect, acts on the circular section of the pipe and parallel to the axis of said pipe, and is shared, to a first approximation, by both pipes (since they are connected together at their ends), pro rata the respective sections of their materials, generally steel.

For installations for use at great depth, undersea pipes and undersea coaxial pipe assemblies are assembled on land to constitute elements having a unit length of the order of 20 m to 100 m, depending on the support capacity of the laying system. They are then transported in this configuration out to sea on a pipe-laying ship. During laying, the unit lengths of the various coaxial pipe assembly elements are connected to one another on board the ship progressively as laying proceeds. It is therefore important to be able to integrate making the connections in the process for constructing the pipe and laying it on the sea bottom, while slowing the process down as little as possible so that it can be performed quickly and easily.

While laying a conventional PiP in great depth, by way of comparison or as described in this patent, said PiP is subjected to bending, mainly in its bottom portion close to the sea bed. Bending is at a maximum at the point of contact with the sea bed since the radius of curvature decreases from the surface down to the point of contact with the sea bed where it is at its minimum, with the PiP thereafter resting substantially horizontally on the bottom of the sea and presenting a radius of curvature that is infinite. The bending that occurs during laying creates high levels of stress in each of the tubes of the PiP and in the connection zone between two successive lengths of PiP.

For this purpose, use is made of junction parts or connection parts that are made of forged steel and that are assembled to the ends of said coaxial pipe assembly elements for joining together. The junction part at the downstream end of a first coaxial pipe assembly element that has not yet been joined is connected to the junction part at the upstream free end of a second coaxial pipe assembly element that has already been joined at its downstream end.

Patent GB 2 396 196 describes junction parts serving to allow thermal expansion of the inner pipe that is subjected to the temperature of the fluid, generally 60° C. to 100° C., relative to the outer envelope which remains at the temperature of the sea bottom, generally 3° C. to 5° C., and to do this it creates a discontinuity in the inner pipe and a connection between the inner pipe and the outer pipe via a radial wall that is relatively fine and deformable. The junction part described in GB 2 396 196 thus does not enable a rigid connection to be made between the inner pipe and the outer envelope at the ends and suitable for properly transferring traction, compression, and bending stresses between said inner pipe and the outer envelope, and also enabling fatigue phenomena to be withstood during the laying operations and throughout the lifetime of the PiP, particularly with bottom-surface connections that are subjected to the effects of swell and of current, and where said lifetime can exceed 25 or 30 years.

Patents GB-2 161 565 and GB-2 191 842 describe a PiP and its method of assembly, and also two methods of making forged connection or junction parts, the first patent GB-2 161 565 describing a one-piece forging, and the second patent GB-2 191 842 describing a two-piece forging, with the junction between the two pieces of each of the two junction parts being provided by a screw thread, said thread being coated in adhesive to provide sealing.

In both examples, the forging has two circularly symmetrical branches comprising an outer branch and an inner branch defining an annular space, i.e. branches forming a fork with free cylindrical ends that are assembled to the cylindrical ends of the outer and inner pipes, respectively.

Nevertheless, in both embodiments, shortcomings are to be found in the mechanical reliability of the connection between unit lengths of coaxial pipe assemblies fitted at their ends with such junction or connection parts.

One of the shortcomings of the junction forgings proposed in those prior patents lies in the connection zones of said junction parts, since the diameter of the parts is reduced and corresponds substantially to the diameter of the inner pipe. As a result there is a very significant change in the second moment of area of the cross-section of the PiP between the main or intermediate zone of said PiP and said end or connection zone between two of said unit lengths of PiP, which leads to a point of weakness being created at each of these welded connections between two forgings, the zone of said welding then being particularly sensitive to fatigue phenomena, both during laying and during the lifetime of the pipe.

To avoid having such a zone of weakness and to conserve a substantially constant second moment of area for the cross-section, it is possible to increase the wall thickness of the forging over the entire zone situated between the solid portion of said forging and the chamfered zone where welding is performed. However it is then necessary substantially to double said thickness. For pipes of large diameter that are to be laid at great depths, welding becomes problematic because of the very great thickness of steel, since said thickness can be as great as 40 millimeters (mm) to 50 mm, thus requiring welding techniques that are very difficult to perform, and indeed in some circumstances practically impossible to perform without including defects, given the dynamic effects that can be applied to the mass of molten steel while at sea. In addition, since said welding is performed on board pipe-laying ships, which ships present extremely high hourly costs, the cost of an installation becomes prohibitive, and the risks of failure are considerable because of the complexity of said on-site welding operations.

It is then preferable to use the method described in patent FR-2 751 721 which consists in a technique for making the ends of a PiP combined with a technique for reinforcing the connection zone between two unit lengths of PiP by means of a sliding sleeve that presents small clearance relative to the outer envelope, said sliding sleeve being secured to said outer envelope by adhesive. That disposition serves to increase the second moment of area of the cross-section locally so as to limit stresses in the connection zone between two unit lengths of PiP, but it requires several mechanical parts to be manufactured that are complicated to assemble, and it requires connection operations that are relatively difficult to implement. In addition, the proposed adhesive remains subject to creep and deteriorates over the thermal cycling to which pipes are subjected over a lifetime of 20 to 30 years. Finally, that type of adhesive cannot be made reliable for bottom-surface connections, since the dynamic effects of swell and current on the suspended pipe between the sea bottom and the floating support rapidly degrade the plane of adhesive bonding, leading rapidly to excessive fatigue in the PiP connection zones.

OBJECTS AND SUMMARY OF THE INVENTION

Thus, the problem posed is that of connecting together unit lengths of a PiP type coaxial pipe assembly that is improved so as to facilitate implementing the connection means and the operations of making a connection, particularly by optimizing laying equipment, and in which the connection zones between two unit lengths are reinforced so that the stresses generated during laying are minimized and so that fatigue behavior for bottom-surface connections is greatly improved.

To do this, the present invention provides a circularly symmetrical junction part for joining together two elements of an assembly of at least two coaxial pipes, the assembly comprising an outer pipe containing an inner pipe defining an annular space preferably containing a lagging material, said junction part being defined as follows:

in a radial direction relative to a longitudinal axis XX' of symmetry of said part, it is defined by a cylindrical inner wall of substantially the same diameter as the intermediate portion of said inner pipe, and by a cylindrical outer wall of diameter substantially equal to the outside diameter of the intermediate portion of said outer pipe; and in the direction of the longitudinal axis XX':

on the end of said junction part that is to be connected by welding to the ends of said outer and inner pipes of a said element of an assembly of at least two coaxial pipes, said outer and inner walls of said junction part forming in longitudinal section respective outer and inner first branches of substantially the same thickness as said outer and inner pipes to which they are to be connected, said outer and inner first branches defining a first annular cavity; and at the opposite end of said junction part that is to be joined to another said junction part, itself connected by welding to the end of another element of an assembly of two coaxial pipes, said outer and inner walls forming in longitudinal section respective outer and inner second branches defining a second annular cavity;

the two said junction parts being suitable for being welded to each other solely via the ends of said outer second branches ($5_1$), the ends of said two inner branches ($5_2$) that are not welded together coming into abutting contact one against the other while said two junction parts are being joined together, such that said second annular cavities (6) are not sealed off from the inside of said inner wall and said inner pipe; and the bottoms of said first and second cavities being spaced apart in said longitudinal direction XX' so as to define a massive solid zone of said junction part in which said outer and inner walls form the outer and inner faces of a single cylindrical wall.

A junction part of the invention is constituted by a single metal forging, i.e. it is made as a single piece, preferably of steel, and more preferably of a steel alloy.

The present invention also provides an element of an assembly of at least two coaxial pipes constituted in its intermediate portion by an outer pipe and an inner pipe defining an annular space, preferably containing lagging material, wherein:

at least one of its ends it includes a junction part of the invention, connected thereto by welding via the ends of said outer and inner first branches and the same-thickness ends of said outer and inner pipes, respectively;

one of said inner and outer first branches ($3_2$, $3_1$) of said junction part presents an end that projects relative to the end of the other first branch by a length that is suitable for matching the length whereby the corresponding end of one of said outer and inner pipes ($2_1$, $2_2$) projects relative to the other pipe; and said first annular cavity is preferably filled with a said lagging material.

The present invention also provides a method of joining together two elements of an assembly of at least two coaxial pipes of the invention, the method comprising the following steps:

1) joining a said first coaxial pipe assembly element having a first said junction part at its downstream end to a second said coaxial pipe assembly element having a second said junction part at its upstream end, said two outer second branches of said first and second junction parts preferably being of the same thickness; and 2) bringing together and welding together only the free ends of said outer second branches of said first and second junction parts of said two elements of an assembly of at least two coaxial pipes to be joined together, the non-welded ends of said two inner branches ($5_2$) coming into abutting contact against each other during joining of said two junction parts, such that said second annular cavities (6) are not sealed off from the inside of said inner wall and said inner pipe.

The present invention also provides an assembly of at least two coaxial pipes constituting in its intermediate portion by an outer pipe ($2_1$) and an inner pipe ($2_2$) defining between them an annular space ($2_3$), preferably containing lagging material ($2_4$) and obtained by a method of the invention, the assembly including at least two of said coaxial pipe assembly elements, each having at least one end a said junction part joined to the junction part of the other said coaxial pipe assembly element, said two junction parts being welded together only via the ends of said outer second branches ($5_1$), the non-welded ends of said two inner branches ($5_2$) coming into contacting abutment against each other during joining of said two junction parts, such that said second annular cavities (6) are not sealed off from the inside of said inner wall and said inner pipe.

Forming said first and second annular cavities serves firstly to establish continuity in terms of the inside diameter of the inner pipe, and secondly to provide relative continuity and identical second moment of area for the cross-section both of the intermediate or main zone of the PiP and of the connection zone, the thickness of the outer branch of the forged junction part being substantially equal to or slightly greater than the thickness of the intermediate portion of the outer pipe.

The separation between the ends of said outer and inner first branches and the bottom of the first cavity, and the separation between the end of said second outer branch and the bottom of the second cavity make it possible to perform welding under better conditions, since the masses of steel on both sides of the welding zone are substantially equal, and the welding zone is then no longer disturbed by a "radiator" effect caused by the solid and massive zone situated between the bottoms of said first and second cavities, where said disturbance consists in unbalanced cooling between the left and right sides of the welding zone.

The continuity in the diameter of the outer wall along said junction part and relative to the outside diameter of the intermediate portions of the outer pipes makes it possible to create a considerable increase in the second moment of area of the cross-section in the connection zone between two adjacent junction parts, thereby reinforcing the connection, precisely where stresses are at a maximum. The second moment of area of the cross-section of a pipe about its center varies with the fourth power of its radius, which leads to a considerable thickness being necessary in the prior art as described in GB-2 161 565 or GB-2 191 942. In contrast, when the cross-section in question is that of the outer pipe of the PiP, the thickness required is greatly reduced, and even under certain circumstances divided by two, thereby considerably simplifying assembly operations by welding performed on board installation ships under conditions that can be difficult.

Furthermore, the fact that the two adjacent junction parts are welded together only via the ends of said outer second branches, enables all of the load transfer and stress phenomena to be localized in the outer level without involving said inner walls, thereby making it possible to have better control over the risks of cracking or fatigue phenomena and to avoid the device collapsing completely at the inner wall.

In addition, the fact that the two ends of said inner second branches of two adjacent parts of the invention are not welded together, serves to accommodate small movements between said facing inner walls due to possible bending or variations in pressure or temperature, and allows said inner walls to deform plastically, since it is possible for said inner second branches to be upset without any risk of transferring contact compression loads, thus making it possible to avoid disturbing the distribution of stresses in the assembly zone with the major portion of the stresses being transferred via the outer walls of said parts.

The formation of said cylindrical inner wall and the abutment between the free ends of said inner second branches of the two joined-together junction parts ensures almost complete continuity with the inner pipe and makes it possible to avoid vortex type turbulence phenomena in the flow of fluid inside the device after elements have been joined together and on going past the join between two said junction parts of two adjacent portions of PiP.

Finally, the massive solid zone between the bottoms of said first and second cavities enables compression or traction forces to be transferred between the inner and outer pipes.

All of these characteristics contribute to greatly improving behavior in bending, and also in fatigue, of a device involving two elements of a coaxial assembly fitted with said junction parts and connected together on board installation ships.

Furthermore, said junction parts can be manufactured and connected relatively easily and reliably both concerning joining together two adjacent junction parts, and concerning the connection of a junction part with one end of an assembly of at least two coaxial pipes.

It should be observed that after the two junction parts have been joined together, said second cavity does not need to be sealed off from the inside of said inner wall and said internal pipe, since when a fluid begins to flow inside it, the fluid will migrate into the second cavity, with overall sealing being provided by the outer weld between the ends of said outer second branches, so the fluid becomes trapped in said second cavity throughout the lifetime of the installation.

According to characteristics of the present invention that are preferred and advantageous:

the free end of said outer second branch presents a shape, preferably a chamfer, that makes it suitable for being welded to the free end of another said outer second branch of another junction part to which it is to be joined, said other junction part itself being connected to the end of a second said element of an assembly of two axial pipes; and the free end of said inner second branch presents a shape suitable for coming into contacting abutment without being welded against the free end of another said inner second branch of another said junction part connected to the end of a said second coaxial pipe assembly element; and the free ends of said second outer branch ($5_1$) and inner branch ($5_2$) of a single junction part coming substantially to the same level in said longitudinal direction (XX'); and the two said outer second branches of the two said junction parts that are to be assembled together by welding being of the same thickness, greater than the thickness of the outer pipe of the PiP, and preferably greater than the thickness of said inner second branch of said junction part; and the end of said outer second branch presents an outwardly-facing chamfer suitable for being welded from the outside;

the free ends of said outer and inner first branches present a shape, preferably a chamfer 8, making them suitable for being welded to the respective free ends of said outer and inner pipes, preferably suitable for being welded respectively from the outside of said outer pipe for said outer first branches, and from the inside of said inner pipe for said inner first branches.

In an advantageous embodiment, said inner second branch includes on its end face at its free end and extending in the longitudinal zone ZZ', a male or female centering element suitable for co-operating with a female or male element on the end face at the free end of a said other inner second branch of another said junction part to which it is to be joined, in such a manner as to:

provide a centering effect between two junction parts when they are brought together in order to be joined together; and adjust the spacing between the end faces of said outer second branches of said junction parts to be joined together while they are being brought together for joining purposes so that, preferably, joining can be performed by welding and said welding can be implemented over the entire thickness of said end faces of said outer second branches that are to be joined together.

More particularly, said male element is constituted by a shape that is preferably circularly symmetrical, projecting from said end face of said inner second branch, said male element being suitable for co-operating with a corresponding female element constituted by a complementary, and preferably circularly symmetrical, shape hollowed in the end face of a said inner second branch of a said other junction part to which it is to be joined.

Still more particularly, said projecting shape of said male element is formed by an annular gasket fitted on said end face of said inner second branch.

In an advantageous embodiment, the thickness of said inner second branch tapers between the bottom of said second annular cavity and said end face of said inner second branch, the surface of said inner second branch thus being inscribed in a conical envelope, for example.

This inner wall that tapers in said inner second branch can act as an optional abutment while facilitating plastic deformation and potential upsetting during bending movements or variations in pressure or temperature, with the major fraction of the stresses being transmitted almost completely via said outer second branch.

In an advantageous variant embodiment, the end of said inner first branch at the end of said junction part suitable for being connected directly to a said element of a said coaxial pipe assembly projects in said longitudinal axial direction XX' relative to the end of a said outer first branch in such a manner that said junction part can be assembled to a said coaxial pipe assembly in which the end of said outer pipe projects by substantially the same length relative to the end of said inner pipe. This embodiment is made necessary to enable the welds connecting the forged junction part and the inner and outer pipes to be performed from the outside.

More particularly, the end of said outer first branch presents an outwardly-facing chamfer suitable for enabling welding to be performed from the outside, and the end of said inner first branch presents an inwardly-facing chamfer suitable for enabling welding to be performed from inside said inner pipe.

In a particular embodiment, said first and second annular cavities present an oblong shape in longitudinal section, the bottoms presenting a curved shape with radii of curvature that are preferably identical.

Still more particularly:

the bottoms of said first and second cavities are spaced apart by a length equal to 0.5 to 3 times the maximum thickness of the wall of said junction part in said solid zone;

said outer and inner first branches form a said first cavity of length equal to 1 to 5 times the thickness of the outer and inner pipes, respectively; and said outer and inner second branches form a said second cavity of length equal to 1 to 5 times the thickness of said outer second branch; and the thickness of said outer second branches is 5% to 100%, preferably 30% to 70%, greater than the thickness of said outer pipe.

According to particular characteristics of a method of joining together two elements of an assembly of two coaxial pipes in accordance with the invention:

at least one of said inner second branches of said first and second junction parts to be joined together present thickness that tapers away from the bottom of said second cavity towards the end face of said inner second branch; and one of said inner and outer second branches of a said first junction part projects beyond the end of the other branch by a length suitable for matching the length whereby the end of one of said inner and outer second branches of a said second junction part to which said first junction part is joined projects beyond the other one of said end; and said outer and inner second branches of each of said two junction parts are such that their ends are at substantially the same level in said longitudinal axial direction XX'.

BRIEF DESCRIPTION OF THE DRAWINGS

Other characteristics and advantages of the present invention appear in the light of the following detailed description with reference to the following figures, in which:

FIG. 1A is an axial longitudinal section view of a PiP comprising a first junction part 1*a* welded at its end using a first welding mode;

FIG. 1B is an axial longitudinal section of the second end of the FIG. 1A PiP, having a second junction part 1*b* welded using a second welding mode;

FIG. 2 is an axial longitudinal section of the join between two lengths of PiP each fitted with a junction part 1*a*, 1*b* at its end; and FIGS. 2A to 2E show variant embodiments of the ends of junction parts where they are joined together.

DETAILED DESCRIPTION OF THE PRESENTLY PREFERRED EMBODIMENTS

The junction parts 1*a* and 1*b* of the invention are substantially cylindrical bodies of revolution and are for joining together two elements of an assembly of at least two coaxial pipes, each element comprising an outer pipe $2_1$ containing an inner pipe $2_2$ and defining an annular space $2_3$ containing lagging material $2_4$, the annular space preferably being under reduced gas pressure, said elements being referred to below as unit lengths of PiP.

Said junction part $1a$, $1b$ is defined as follows:

in a radial direction relative to a longitudinal axis XX' of symmetry of said part, it is defined by a cylindrical inner wall $1_2$ of substantially the same diameter as the intermediate portion of said inner pipe $2_2$, and by a cylindrical outer wall $1_1$ of diameter substantially equal to the outside diameter of the intermediate portion of said outer pipe $2_1$; and in the direction of the longitudinal axis XX':

on the end of said junction part that is to be joined by welding 9 to the ends of said outer and inner pipes of a said element of an assembly of at least two coaxial pipes, said outer and inner walls $1_1$, $1_2$ of said junction part forming in longitudinal section respective outer and inner first branches $3_1$, $3_2$ of substantially the same thickness as said outer and inner pipes $2_1$, $2_2$ to which they are to be joined, said outer and inner first branches $3_1$, $3_2$ defining a first annular cavity 4; and at the opposite end of said junction part that is to be joined to another said junction part, itself connected by welding 9 to the end of another element of an assembly of two coaxial pipes, said outer and inner walls $1_1$, $2_1$ forming in longitudinal section respective outer and inner second branches $5_1$, $5_2$ defining a second annular cavity 6; and the bottoms $4_1$, $6_1$ of said first and second cavities 4, 6 being spaced apart in said longitudinal direction XX' so as to define a massive solid zone 10 of said junction part in which said outer and inner walls $1_1$, $1_2$ form the outer and inner faces of a single cylindrical wall.

As shown in FIG. 2, the first annular cavity 4 is open to the annular space $2_3$ and can receive the lagging material $2_4$ so as to continue insulating the pipe as far as possible.

After two unit lengths of PiP fitted with junction parts forged in accordance with the invention have been joined and connected together, the second annular cavity 6 of a first junction part at the downstream end of a first length of PiP is open to a second annular cavity of a second junction part $1a$ at the upstream end of a second length of PiP, thus forming a chamber made by welding together the ends of the outer second branches $5_1$. However this chamber is not sealed since the ends of the inner second branches $5_1$ of the two junction parts $1a$ and $1b$ are not welded together, the faces of said branches merely being in contact with each other.

According to the invention, the free ends of said outer and inner first branches $3_1$ and $3_2$ present a shape with a chamfer 8 thus enabling a so-called "full penetration" first welding pass to be performed followed by complete filling of the chamfer as shown at 9. In FIG. 1A, the chamfers 8 face towards the outside and are therefore suitable for being welded together from the outside of said outer and inner pipes $3_1$ and $3_2$. In FIG. 1B, the chamfers 8 face towards the outside of the end of said outer first branch and towards the inside at the end of said inner first branch, making them suitable respectively for being welded together from outside said assembly for said outer first branches, and from inside said inner pipe for said inner first branches.

For clarity in description, FIGS. 1A, 1B, and 2 show the various component elements welded together in the bottom halves thereof, and positioned face-to-face prior to the welds 9 being made in the top halves thereof.

In FIG. 2, the free ends of said outer second branch $5_1$ present the shape of a chamfer 8 facing towards the outside of a first junction part $1a$ making it suitable for being welded from the outside to the free end of another said outer second branch of another junction part $1b$ to which it is to be joined, said other junction part itself being at the end of a second element of an assembly of two coaxial pipes.

In the forged junction part $1a$, the end of said inner first branch $3_2$ at the end of said junction part that is suitable for being connected directly to a said element of a said coaxial pipe assembly projects in said longitudinal axial direction XX' relative to the end of a said outer first branch $3_1$ in such a manner that said junction part can be connected by being welded to a said coaxial pipe assembly in which the end of said outer pipe projects relative to the end of said inner pipe.

In a preferred version of the invention, the forged junction parts $1a$-$1b$ are made as shown in FIG. 2 and present an outer diameter and a wall thickness that are substantially equal, and preferably equal, to the corresponding dimensions of the intermediate portion of the outer envelope. By proceeding in this way, the pipe presents over its entire length a second moment of area that is substantially constant, thus avoiding accumulation of stress at the joins between two unit lengths of PiP, and considerably improving the bending and fatigue behavior of the pipe, thereby enabling it to survive throughout the lifetime of installations, particularly when used in bottom-surface connections that are subjected to the effects of swell and current, which lifetime can reach and exceed 30 years.

To avoid undesirable vortex phenomena at the join between two forged junction parts $1a$ and $1b$ of two adjacent portions of PiP, when crude oil is flowing inside the inner pipe, the inside diameter of the forged junction part $1a$ is extended as far as the junction face with the corresponding part $1b$, but the junction is not welded so as to avoid phenomena of transferring load and stresses between the outer envelope and the inner pipe which would run the risk of leading to cracking or the fatigue phenomena that would inevitably lead to the complete failure of the pipe. The two extensions of the inner portion thus serve merely to provide continuity in the inside diameter of the inner pipe and they can be machined in numerous ways, as shown in FIGS. 2A to 2E.

In FIG. 2A, the front face 7 of the forged end part $1b$ presents a circularly symmetrical male shape that co-operates with the corresponding female shape in the front face of the forged junction part $1a$, thus providing not only an automatic centering effect between the two forged end parts when they are approached for final joining purposes where the pipe is being laid within a J-laying tower, but it also serves to adjust the spacing between the parallel faces of the two chamfers 8, which spacing must be extremely accurate for welding to be performed in known manner with full penetration, thereby providing best strength.

The shape shown in FIG. 2B does not provide for automatic centering of the two parts relative to each other, so an external or internal centering device is needed during welding, however it does make it possible to guarantee the spacing between the parts in the chamfer zone. It should also be observed that the forged junction part $1b$ presents a wall of reduced thickness, thus enabling it to act as an abutment during the welding stage. However, because of its reduced wall thickness, in the event of tiny movements between the facing walls due to bending, to pressure variations, and to temperature variations, said wall of reduced thickness will tend to deform plastically and be upset since it does not present sufficient section, and thus sufficient strength to transfer contact compression loads. This serves to avoid disturbing the distribution of stress in said join zone, and practically all of the stresses are taken up via the outer branches $5_1$. Bending behavior during laying is thus greatly improved, and for bottom-surface connections the fatigue behavior makes it possible to achieve lifetime targets, i.e. 30 years or longer, even in seas that have a reputation of being difficult, such as the North Sea or the Gulf of Mexico.

In FIGS. 2A to 2D, only one of said inner second branches $5_2$ of said first and second junction parts to be joined together presents thickness that tapers away from the bottom $6_1$ of said second cavity towards said front face 7 at the end of said inner second branch $5_2$, and said outer and inner second branches $5_1$ and $5_2$ of each of said two junction parts are such that their ends are substantially at the same level in said longitudinal axial direction of their inner and outer second branches $5_2$ and $5_1$. However, it is possible to envisage that each of the forged parts 1a, 1b presents the same conical shape leading to a reduced contact so as to avoid the above-described undesirable phenomena.

In FIG. 2E, the two inner second branches present thickness that decreases going from the bottom of the second cavity towards the end, but in this configuration they overlap one on the other, i.e. their end front faces no longer face each other.

By way of example, for a forged junction part 1a having an inside diameter of 300 mm, and presenting an inner pipe with thickness of 19 mm, the tapering stub of the corresponding forged junction part 1b is advantageously reduced to 3 mm in order to eliminate the above-described undesirable phenomena.

In FIG. 2D, there is shown a fitted gasket 7a, preferably a metal gasket, or rather a discontinuous or porous metal ring which then acts merely to provide centering. The gasket must not be leaktight so as to ensure that fluid can pass from the inside of the inner pipe into the chamber 6.

The second annular cavity 6 is oblong in shape with the radius of curvature of its circular bottom $6_1$ preferably being identical to the radius of curvature of the bottom $4_1$ of the first annular cavity 4 in the connection zone between the outer envelope $2_1$ and the inner pipe $2_2$ of the PiP. This second annular cavity 6 must not be sealed against the inside of the inner pipe, but must be in communication therewith, since during final testing, or when starting production, the fluid migrates towards said second cavity 6, with the pipe being made leaktight by the outer weld bead 9, and with said fluid becoming trapped therein throughout the entire lifetime of the installation, with hardly any renewal thereof.

The outside diameter of said first outer wall $1_1$ generally lies in the range 150 mm to 750 mm or even more, with the inside diameter of said inner wall $1_2$ of said junction part lying in the range 50 mm to 700 mm.

By way of example, a PiP constituted by an inner pipe having an inside diameter of 203.2 mm and thickness of 16.3 mm, and an outer pipe having an inside diameter of 293.05 mm and thickness of 15.4 mm presents a cross-section whose second moment of area about its center is 245,984,742 $mm^4$.

In order to ensure that the second moment of area is equivalent in the assembly between two unit lengths, it is necessary:

according to the prior art of patent GB 2 161 565, to have a forged junction part without an additional fitted sleeve, presenting wall thickness at the connecting weld between the two unit lengths of PiP equal to 41.5 mm;

according to the prior art of patent FR 2 751 721, to have a forged junction part associated with a sleeve that is 10 mm thick and that is fitted by adhesive, presenting wall thickness at the connection weld between two unit lengths of PiP that is equal to 16.3 mm; and according to the invention, to have a forged part without an additional sleeve, presenting wall thickness at the connection weld between two unit lengths of PiP equal to 22.83 mm, i.e. said outer second branches must have a thickness of 22.83 mm.

Thus, the thickness of the forged junction part of the invention, at the outer second branch, remains reasonable and is substantially greater than the thickness of the outer pipe, without it being necessary to fit an additional sleeve, where such a sleeve does not guarantee reliability over time.

When welding large thicknesses of steel, i.e. greater than 25 mm to 30 mm, it is necessary to apply welding procedures that are very tricky, and thus very difficult to perform in a short length of time. With extreme thicknesses of 40 mm to 50 mm or more, it can be necessary to provide X-shaped chamfers which then require one stage of welding from the outside and another stage of welding from the inside, thereby considerably complicating the installation of pipes on board laying ships, and significantly increasing the operating time required, and also running the risk of welds breaking over time, because of the complexity involved in making them on site.

The assembly mode using forged junction parts of the invention thus constitutes a preferred mode for making bottom-to-surface connections that need to withstand fatigue over periods of 20 years to 30 years or more, because of the absence of any fitted outer sleeve and because of the reasonable thickness of the outer second branch, thus making it possible to use conventional welding procedures that are thoroughly mastered.

What is claimed is:

1. An assembly of at least two coaxial pipes constituted in an intermediate portion of the assembly by an outer pipe and an inner pipe of said two coaxial pipes, an annular space defined between the outer pipe and the inner pipe, the assembly including at least two coaxial pipe assembly elements, each of said two coaxial pipe assembly elements having at least one end a junction part joined to the junction part of the other of said two coaxial pipe assembly elements, each of the two said junction parts being a body of revolution defined as follows:

in a radial direction relative to a longitudinal axis XX' of symmetry of each said junction part, each said junction part is defined by a cylindrical inner wall of substantially the same diameter as the intermediate portion of said inner pipe, and by a cylindrical outer wall of diameter substantially equal to the outside diameter of the intermediate portion of said outer pipe; and in the direction of the longitudinal axis XX':
on the end of each said junction part that is connected by welding to the ends of said outer and inner pipes of said coaxial pipe assembly element having said junction part, said outer and inner walls of each said junction part forming in longitudinal section respective outer and inner first branches of substantially the same thickness as said outer and inner pipes to which said outer and inner first branches are connected, said outer and inner first branches defining a first annular cavity; and
at the opposite end of each said junction part that is joined to the junction part of the other of said two coaxial pipe assembly elements, each said junction part is connected by welding to the end of the other of said two coaxial pipe assembly elements, said outer and inner walls forming in longitudinal section respective outer and inner second branches defining a second annular cavity;

the two said junction parts being welded to each other solely via the ends of said outer second branches, the ends of said two inner branches that are not welded together being in abutting contact one against the other such that said second annular cavities are not sealed off from the inside of said inner wall and said inner pipe; and the bottoms of said first and second cavities being spaced apart in said longitudinal direction XX' so as to define a massive solid zone of each said junction part in which said outer and inner walls form the outer and inner faces of a single cylindrical wall.

2. The assembly of at least two coaxial pipes according to claim 1, wherein the free end of said outer second branch of each of the two said junction parts presents a shape respectively welded to the free ends of another said outer second branches of another said junction parts to which the free end of said outer second branch of each of the two said junction parts is respectively joined, said another said junction parts respectively connected to the ends of another said coaxial pipe assembly elements;

the free end of said inner second branch of each of the two said junction parts presents a shape respectively in contacting abutment without being welded against the free ends of another said inner second branches of said another said junction parts respectively connected to the ends of said another said coaxial pipe assembly elements;

the free ends of said second outer branch and inner branch of a single junction part coming substantially to the same level in said longitudinal direction;

the two said outer second branches of each of the two said junction parts and the another said junction parts that are respectively assembled together by welding being of the same thickness, greater than the thickness of said outer pipe.

3. The assembly of at least two coaxial pipes according to claim 1, wherein the free ends of said outer and inner first branches of at least one of said two junction parts present a shape welded to the respective free ends of said outer and inner pipes, respectively from the outside of said outer pipe for said outer first branches, and from the inside of said inner pipe for said inner first branches.

4. The assembly of at least two coaxial pipes according to claim 1, wherein said first and second annular cavities present an oblong shape in longitudinal section, the bottoms of said first and second annular cavities presenting a curved shape with radii of curvature.

5. The assembly of at least two coaxial pipes according to claim 1, wherein the bottoms of said first and second cavities of each said junction part are spaced apart by a length equal to 0.5 to 3 times the maximum thickness of the wall of said junction part in said solid zone;

said outer and inner first branches of each said junction part form said first cavity of length equal to 1 to 5 times the thickness of the outer and inner pipes, respectively;

said outer and inner second branches of each said junction part form said second cavity of length equal to 1 to 5 times the thickness of said outer second branch;

the thickness of said outer second branches of each said junction part is 5% to 100% greater than the thickness of said outer pipe.

6. The assembly of at least two coaxial pipes according to claim 1, wherein said inner second branch of one of the two said junction parts of said two coaxial assembly elements includes on an end face at the free end and extending in the longitudinal zone ZZ', a male or female centering element configured to co-operate with a female or male element on the end face of the free end of said inner second branch of the junction part of the other of said two coaxial pipe assembly elements to which the male or female centering element is joined, in such a manner as to:

provide a centering effect between the two junction parts when the two junction parts are brought together and joined together; and adjust the spacing between the end faces of said outer second branches of said junction parts which are joined together so that the welding is implemented over the entire thickness of said end faces of said outer second branches that are joined together.

7. The assembly of at least two coaxial pipes according to claim 6, wherein said male element is constituted by a shape projecting from said end face of said inner second branch, said male element co-operating with a corresponding female element constituted by a complementary shape hollowed in the end face of a said inner second branch of the junction part of the other of said two coaxial pipe assembly elements to which the male element is joined.

8. The assembly of at least two coaxial pipes according to claim 7, wherein said projecting shape of said male element is formed by an annular gasket fitted on said end face of said inner second branch.

9. The assembly of at least two coaxial pipes according to claim 1, wherein the thickness of said inner second branch of one of the two said junction parts tapers between the bottom of said second annular cavity and said end face of said inner second branch.

10. The assembly of at least two coaxial pipes according to claim 1, wherein the end of said inner first branch at the end of each of the two said junction parts respectively connected directly to said coaxial pipe assembly elements projects in said longitudinal axial direction XX' relative to the end of said outer first branch, and the end of said outer pipe projects by substantially the same length relative to the end of said inner pipe.

11. The assembly of at least two coaxial pipes according to claim 10, wherein the end of said outer first branch of each of the two said junction parts presents an outwardly-facing chamfer configured to enable welding to be performed from the outside, and the end of said inner first branch of each of the two said junction parts presents an inwardly-facing chamfer configured to enable welding to be performed from inside said inner pipe.

12. The assembly of at least two coaxial pipes according to claim 11, wherein the ends of said inner and outer second branches of each of the two said junction parts come to substantially the same level in said longitudinal axial direction XX'.

13. The assembly of at least two coaxial pipes according to claim 1, wherein the end of said outer second branch of each of the two said junction parts presents an outwardly-facing chamfer configured to enable welding to be performed from the outside.

14. The assembly of at least two coaxial pipes according to claim 1, wherein each of said junction parts is constituted by a forged metal part.

15. A method of producing said assembly of at least two coaxial pipes according to claim 1, the method comprising the following steps of:

joining a first said coaxial pipe assembly element having a first said junction part at a downstream end of the first said coaxial pipe assembly element to a second said coaxial pipe assembly element having a second said junction part at an upstream end of the second said coaxial pipe assembly element; and bringing together and welding together only the free ends of said outer second branches of said first and second junction parts of said two coaxial pipe assembly elements of an assembly of at least two coaxial pipes to be assembled together, the non-welded ends of said two inner branches coming into abutting contact against each other during joining of said two junction parts to ensure almost complete continuity with said inner pipe.

16. The method according to claim 15, wherein at least one of said inner second branches of said first and second junction parts to be joined together present a thickness that tapers away from the bottom of said second cavity towards the end face of said inner second branch.

17. The method according to claim 15, wherein one of said inner and outer second branches of said first junction part projects beyond the end of the other branch by a length that matches the length whereby the end of one of said inner and outer second branches of said second junction part to which said first junction part is joined projects beyond the other one of said end.

18. The method according to claim 15, wherein said outer and inner second branches of each of said two junction parts are configured such that the ends of each of said two junction parts are at substantially the same level in said longitudinal axial direction.

* * * * *